United States Patent [19]

Miller et al.

[11] Patent Number: 4,965,116

[45] Date of Patent: Oct. 23, 1990

[54] METHOD FOR SEPARATION OF COBALT FROM NICKEL

[75] Inventors: Michael J. Miller; Richard A. Scheithauer, both of Towanda, Pa.

[73] Assignee: GTE Products Corporation, Stamford, Conn.

[21] Appl. No.: 405,708

[22] Filed: Sep. 11, 1989

[51] Int. Cl.$^5$ .................... C01G 51/00; C01G 53/00
[52] U.S. Cl. .................... 423/140; 423/150; 423/493; 423/592
[58] Field of Search ............... 423/139, 140, 147, 150, 423/592, 493

[56] References Cited

U.S. PATENT DOCUMENTS

| | | | |
|---|---|---|---|
| 1,596,253 | 8/1926 | Harshaw | 423/147 |
| 2,377,832 | 6/1945 | Wallis et al. | 423/140 |
| 2,726,144 | 12/1955 | Wallis et al. | 423/140 |
| 2,842,427 | 7/1958 | Reynaud et al. | 423/140 |
| 2,977,221 | 3/1961 | Howling et al. | 423/140 |
| 4,218,240 | 8/1980 | Gingerich et al. | 423/143 |
| 4,233,063 | 11/1980 | Ritsko et al. | 423/143 |
| 4,394,357 | 7/1983 | Mounsey et al. | 423/140 |

FOREIGN PATENT DOCUMENTS

| | | | |
|---|---|---|---|
| 766720 | 1/1957 | United Kingdom | 423/147 |
| 2088842A | 6/1982 | United Kingdom | 423/140 |

*Primary Examiner*—Theodore Morris
*Assistant Examiner*—Paige C. Harvey
*Attorney, Agent, or Firm*—L. Rita Quatrini; Robert E. Walter

[57] ABSTRACT

A method is disclosed for separating cobalt from nickel which consists essentially of adjusting the pH of a cobalt chloride solution containing nickel to about 3 to about 5 with a base, adding hypochlorite to the resulting pH adjusted solution in an amount equal to at least the stoichiometric amount required to oxidize essentially all of the cobalt to the $+3$ state, while maintaining the pH at about 3 to about 5 by addition of a base, to form a solid containing at least about 60% by weight of the cobalt in the $+3$ state and a liquor containing essentially all of the nickel, and removing the solid from the liquor.

4 Claims, No Drawings

METHOD FOR SEPARATION OF COBALT FROM NICKEL

BACKGROUND OF THE INVENTION

This invention relates to a method for separation of cobalt from nickel in chloride solutions by control of pH, type of oxidation agent and stoichiometry. The separation is accomplished without use of expensive reagents.

In the processing of cobalt chloride solutions to produce cobalt metal powder, there is an ongoing problem of presence of nickel. In order for pure cobalt to be obtained, the nickel must be removed at some point in the processing.

Some existing methods of removing nickel involve precipitations and ion exchange processing. Some of these techniques can involve use of expensive equipment and reagents and can be labor intensive.

It would be desirable especially from an economic standpoint to have a method of separating cobalt from nickel in chloride solutions which does not have the above disadvantages.

SUMMARY OF THE INVENTION

In accordance with one aspect of the invention, there is provided a method for separating cobalt from nickel which consists essentially of adjusting the pH of a cobalt chloride solution containing nickel to about 3 to about 5 with a base, adding hypochlorite to the resulting pH adjusted solution in an amount equal to at least the stoichiometric amount required to oxidize essentially all of the cobalt to the $+3$ state, while maintaining the pH at about 3 to about 5 by addition of a base, to form a solid containing at least about 60% by weight of the cobalt in the $+3$ state and a liquor containing essentially all of the nickel, and removing the solid from the liquor.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The present invention relates to the separation of cobalt from nickel in chloride solutions. The difference in solubility between cobaltic hydroxide $[Co(OH)_3]$ and $[Ni(OH)_2]$ is utilized in combination with pH control and use of an oxidizing agent which allows $[Co(OH)_3]$ to be preciptated while allowing the nickel to remain in solution.

The starting solution is a cobalt chloride solution. This solution is an acid solution derived typically from the hydrochloric acid digestion of cobalt bearing material which is normally contaminated with nickel, although it is to be understood that any cobalt chloride solution would be suitable for the purposes of the present invention.

The pH of the starting solution is adjusted to about 3 to about 5 and preferably to about 3 to about 4.5 with a base. It is critical that the pH remain in the above range because at higher pH's, the $Co^{+2}$ and $Ni^2$ precipitate and at lower pH's, $Co^{+3}$ redissolves. The preferred base is sodium hydroxide. Normally the pH is adjusted by adding the sodium hydroxide as a 50% by weight solution.

To the resulting pH adjusted solution is added hypochlorite, preferably sodium hypochlorite, as an oxidizing agent. This agent specifically oxidizes the cobalt to the $+3$ state without affecting the nickel, and cobaltic hydroxide forms which precipitates at pH of about 3 to about 5 while the nickel remains in solution. The amount of oxidizing agent is sufficient to at least oxidize essentially all of the cobalt to the $+3$ state. During the addition of the oxidizing agent, the pH may sometimes drift. Since it is critical to the separation that the pH be about 3 to about 5 and preferably about 3 to about 4.5, the pH is monitored and maintained if necessary in the above ranges by addition of more base.

As a result of the treatment with oxidizing agent and maintaining the pH, a slurry is formed which is made up of solids which contain at least about 60% by weight of the cobalt primarily in the form of cobaltic hydroxide, $[Co(OH)_3]$, and a liquor which contains essentially all of the nickel. It has been found that when sodium hypochlorite is used in an amount sufficient to provide a mole ratio of $ClO^-$ to Co of about 1 to 1, at least about 90% by weight of the cobalt precipitates. The solids are removed from the liquor by standard techniques such as filtration.

The solids can be water washed using preferably hot water to remove any entrained liquor. The solids can then be processed by conventional methods to recover the cobalt in any usable form.

The liquor can be discarded or processed to recover Ni.

To more fully illustrate this invention, the following non-limiting examples are presented.

EXAMPLE 1

To about 0.5 l of $CoCl_2$ solution at a pH of about 4.1 about is added sodium hypopchlorite sufficient to provide a $ClO^-/Co$ mole ratio of about 1:2. The pH is about 3.8. The resulting solids are separated from the resulting liquor by filtration. The solids are washed with hot deionized water and filtered. The washed solids are redissolved in HCl, and the mother liquor, wash solution, and redissolved solids in the HCl are analyzed for Co and Ni.

EXAMPLE 2

To a $CoCl_2$ solution at a pH of about 4.1 is added sodium hypochlorite to provide a $ClO^-/Co$ mole ratio of about 1:1. The pH is about 3.1. The resulting solids are separated by filtration, hot water washed, and filtered. The washed solids are redissolved in HCl and all three solutions (mother liquor, wash and dissolved solids) are analyzed.

A summary of the results of examples 1 and 2 is given in the Table below. The cobalt efficiency is calculated from the liquor and wash filtrate data. The data indicate that higher mole ratios ($ClO^-/Co$) give higher efficiencies. It is also indicated that the lower the pH, the better the Co-Ni separation.

TABLE

|  | Starting Solution | Example 1 | Example 2 |
| --- | --- | --- | --- |
| Mole ratio ClO/Co | — | 1:2 | 1:1 |
| Final pH | — | 3.8 | 3.1 |
| Cobalt Efficiency | — | 60% | 90% |

TABLE-continued

| | Starting Solution | Example 1 | Example 2 |
|---|---|---|---|
| Ni/Co Mole ratio | $3.1 \times 10^{-3}$ | $2.7 \times 10^{-3}$ | $4.5 \times 10^{-4}$ |

While there has been shown and described what are at present considered the preferred embodiments of the invention, it will be obvious to those skilled in the art that various changes and modifications may be made therein without departing from the scope of the invention as defined by the appended claims.

What is claimed is:

1. A method for separating cobalt from nickel, said method consisting essentially of:
   (a) adjusting the pH of a cobalt chloride solution containing nickel to about 3 to about 5 with a base;
   (b) adding hypochlorite to the resulting pH adjusted solution in an amount equal to at least the stoichiometric amount required to oxidize essentially all of said cobalt to the $+3$ state, while maintaining the pH at about 3 to about 5 by addition of a base, to form a solid containing at least about 60% by weight of said cobalt in the $+3$ state and a liquor containing essentially all of said nickel; and
   (c) removing said solid from said liquor.

2. A method of claim 1 wherein the pH of said cobalt chloride solution is adjusted to about 3 to about 4.5.

3. A method of claim 1 wherein said hypochlorite is sodium hypochlorite.

4. A method of claim 3 wherein the amount of said sodium hypochlorite is sufficient to provide a mole ratio of about 1 to 1 of $ClO^-$ to Co.